DATA RECORDING APPARATUS

Filed March 27, 1963

INVENTORS
ALAN FOSTER
RAYMOND OWEN PARMENTER
BY
Kane and Nydick
ATTORNEY

United States Patent Office 3,186,634

Patented June 1, 1965

3,186,634

DATA RECORDING APPARATUS

Alan Foster, Addiscombe, and Raymond Owen Parmenter, Mitcham, England, assignors to International Computers and Tabulators Limited Filed Mar. 27, 1963, Ser. No. 268,408
Claims priority, application Great Britain, Apr. 4, 1962, 12,939
3 Claims. (Cl. 234—112)

The present invention relates to data item recording apparatus, particularly for recording individual items of data in matrix formation on a record.

It has previously been proposed to provide records, such as, for example, perforated record cards, in which individually recorded data items have information significance by virtue of their positions on the record. For example, a conventional record card may carry recorded items in matrix formation of rows and columns, each column forming a location in which an item of information may be recorded and the particular row position in which the item is recorded defining the value or significance of the item.

It is an object of the invention to provide improved apparatus for selectively recording individual data items in matrix formation on a record.

According to the invention data item recording apparatus includes a plurality of individual recording devices arranged in rows and columns; a first group of members, one member for each row of recording devices; a second group of members, one member for each column of recording devices, each carrying linking devices associated respectively with the recording devices of the corresponding column, first means for sequentially operating the members of one of said groups and second means for selectively operating the member of the other of said groups; operation of a member of the second group causing the linking devices to be effective to couple the recording devices of the corresponding column respectively to the members of the first group whereby operation of a member of the first group causes operation of any recording device which is linked thereto by one of said linking devices.

According to one aspect of the invention, data item recording apparatus includes a plurality of individual item recording devices arranged in rows and columns, a plurality of sequentially operable recording initiating members, one for each row, a plurality of engaging members, one for each column, each engaging member carrying linking devices associated respectively with the individual recording devices of the column, each engaging member being operable to condition the linking devices to be effective to couple the recording devices of the column respectively to the initiating members, and means for operating selected ones of said engaging members for each step of the initiating member operating sequences.

Figure 1:
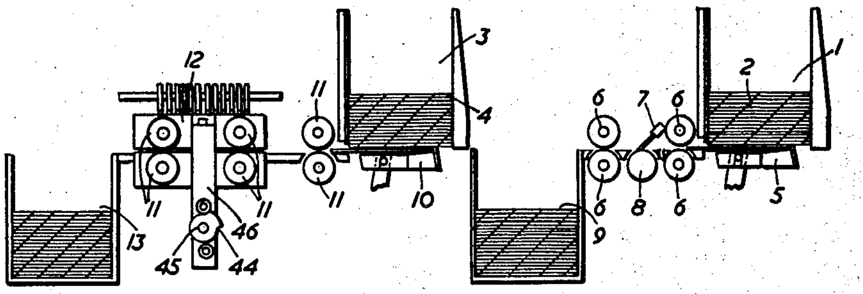
Figure 2:
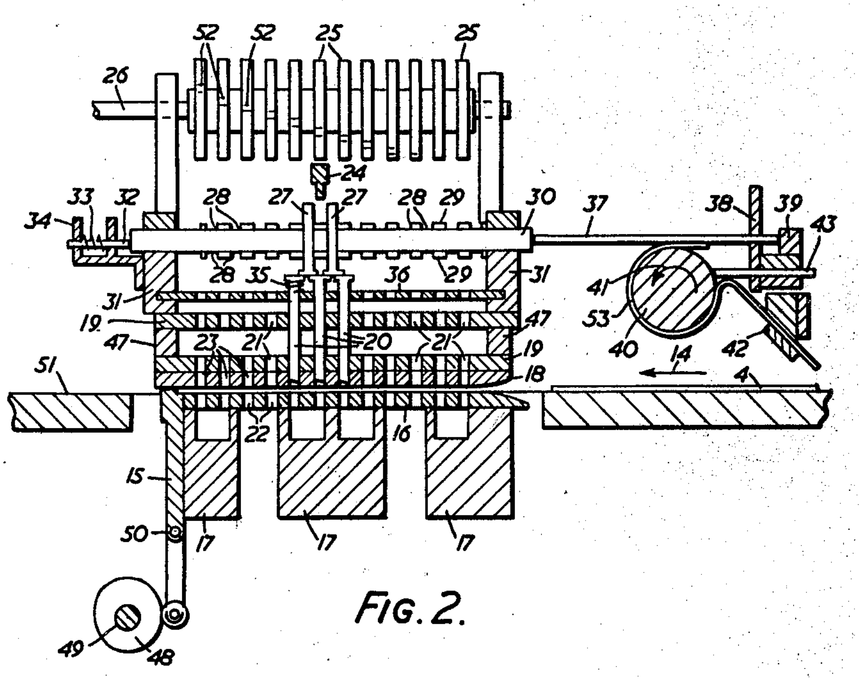

Apparatus embodying the present invention will now be described, by way of example, with reference to the accompanying drawings, in which, FIGURE 1 shows schematically, a record card reproducing apparatus, and FIGURE 2 shows, in greater detail, a record punching arrangement of the apparatus of FIGURE 1.

Referring now to FIGURE 1, a record card reproducing apparatus has a supply hopper 1 containing previously punched record cards 2 and a supply hopper 3 containing blank record cards 4. The hopper 1 is associated with a conventional record card feeding device 5 which is operated under control of a main drive (not shown) to feed the cards 2 singly and in succession through feeding rollers 6 past a reading station consisting of a group of reading brushes 7 and a reading contact roll 8. The cards 2 are then fed into a receiving hopper or stacker 9. The hopper 3 is associated with a somewhat similar feeding arrangement consisting of a feeding device 10, feed rollers 11 and a punching arrangement 12. The cards 4 are fed from the punching arrangement 12 into a stacker 13.

Arrangements for selecting records from a supply hopper and for feeding the selected cards through a reading station into a stacker are well known, and since these feeding arrangements do not form part of the present invention, they will not be further described. Conventional record cards are also known and may have, for example, eighty columns in which data items may be recorded. An item may be recorded for example, by a perforation in any one of twelve positions within a column, and for the sake of simplicity, these positions within a column will be referred to in the present description as index points "1" to "12" respectively. Thus for sensing items from a record card of the kind described, the reading station has eighty brushes 7 arranged in a row across the card feeding path, one brush for each column of the card. As a card is fed by the rolls 6, each brush scans the index points, "1" to "12" in order, of the card column with which it is associated. Thus considering the passage of a card through the reading station as a card sensing cycle, the index points are scanned at predetermined times in the cycle. If a perforation denoting the recording of a data item exists in the column, the sensing brush 7, associated with that column, makes electrical contact with the contact roll 8 at the time when the index point indicated by the perforation is scanned and therefore the time within the sensing cycle at which such contact is made signifies the index point position of the perforation.

The arrangement for feeding cards from the supply hopper 3 into the punching station 12 are similar to these for feeding cards to the reading station. The feeding rolls associated with both stations are driven in common from the main drive (not shown) by suitable drive gearing. However, the common drive is such that a blank card 4 is advanced completely into the punching station 12 immediately before the beginning of the sensing cycle of the corresponding punched card 2.

FIGURE 2 shows the arrangement of the punching station 12 in greater detail. A card 4 is advanced in the direction of arrow 14 by the feed rolls 11 (FIGURE 1) until its leading edge is brought into contact with a stop member 15. The card 4 is then arrested, the feed rolls 11 skidding on the surface of the card. For this purpose the rolls 11 are spring loaded. The card 4 now lies between a punch die plate 16 supported on backing blocks 17 and a stripper plate 18 mounted beneath a punch operating mechanism. This mechanism includes a pair of guide plates 19 which support rows of punch knives 20. Each row contains eighty punch knives, one for each card column and there are twelve rows, so that each column has punch knives corresponding to the index point positions of a card. FIGURE 2 shows a sectional view through one column and it will be appreciated that although only three knives 20 are shown for the sake of clarity, there are in practice twelve knives 20 in the column, each supported in slots 21 in the guide plates 19. There are corresponding slots 22 and 23 in the die and stripper plates 16 and 18 respectively.

Supported above the rows of knives and axially aligned therewith are a group of initiating bails 24, there being twelve bails 24 in all, one for each row. For the sake of simplicity, however, only a single bail is shown, in sectional view, in FIGURE 2. The bails 24 are supported for motion in a vertical direction as shown in FIGURE 2 and are moved under control of a group of cams 25 at each side of the apparatus. Only one of the cam groups is shown in FIGURE 2 and consists of twelve cams 25 mounted on a common shaft 26. Each cam has a single high-point 52 and the high-points of the cams in the group are staggered in sequence so that as the shaft 26 rotates, the cams 25 cooperate with the bails 24 to move the bails 24 downwards in succession, starting from the bail 24 on the extreme left-hand side as shown on the drawings. The shaft 26 is connected through suitable gearing to the main drive (not shown) and the gearing and disposition of the cams 25 are so arranged that each bail 24 is moved downwards immediately after the sensing of the corresponding index point of a card column by the sensing brush 7 (FIGURE 1).

Between each punch knife 20 of a row and the corresponding bail 24 is a linking member 27. The linking members of a row are all supported in slots 28 cut in lugs 29 projecting from a slide 30. In the present case there are eight slides 30, supported in grooves in side members 31 of the punching station 12. The slides 30 are normally pushed into an inoperative position by means of pins 32 loaded by means of springs 33. The pins and springs are supported in a bracket 34 mounted on one of the side members 31. In the inoperative position the linking members 27 are so positioned that the bails move between adjacent linking members. If, however, the slides 30 are moved against the pressure of the springs 33, that is, towards the left as shown in the figure, they occupy an operative position in which the linking members are interposed between the bails 24 and the punch knives 20. Thus, movement of the slide 30 causes the linking members to couple the bails 24 to the punch knives 20 and the downward movement of a bail 24 will then cause the punch knives of the corresponding index point row to pass through the card into the punch die 16.

It will be apparent that selective movement of the slides 30 allows a hole to be punched in any required data item recording position on the record card. Each slide 30 is individually selected for movement from the inoperative position to the operative position under control of a push rod 37. The rod 37 is supported in bearings in support plates, such as that referenced 38 in the FIGURE 2, and abuts a limiting stop 39. The rod 37 is operated under control of a so-called electrostatic clutch. This clutch consists of a ceramic-covered drum 40 mounted for rotation in the direction of arrow 41. Stainless steel bands 53 are each supported by a clamp 42 aligned with the card columns. Each of the bands is formed about, but out of contact with, the drum 40, and the band is coupled at one end to a corresponding push rod 37. The drum 40 is of electrically conductive material and the application of a D.C. voltage pulse between the band and the drum causes the band to become momentarily attracted towards the drum with the result that the upper end of the band as shown in the figure moves towards the left, carrying the push rod 37 and slide 30 in this direction. A pad of polytetrafluoroethylene 43 is provided for effecting lubrication of the drum surface. A suitable form of electrostatic clutch for this purpose is shown and described in greater detail in British Patent No. 824,208 and it will be appreciated that since the function of this clutch is merely to provide a movement of the push rod 37, in response to an electrical signal, other apparatus may be used for this purpose. For example, an electromagnet assembly may be used directly to operate the push rod or to engage the rod with a lever mechanism cam-driven by the main drive.

It will be apparent that if the clutch or other push-rod actuating device of a particular column is supplied with an electrical signal derived from the reading brush 7 (FIGURE 1) sensing a column of the card 2, then this signal will occur at the time in the cycle when the appropriate bail 24 (FIGURE 2) is about to commence its downward movement. Thus, the slide 30 is moved to its operative position and the knife 20 corresponding in index point significance to the bail is actuated. The slides 30 associated with card columns in which no hole was detected by a reading brush 7 (FIGURE 1) are not moved, so that the punch knives 20 (FIGURE 2) of these columns are not operated. Any linking members 27 which have been operated by the bails 24 are restored by springs (not shown).

The card feeding arrangements are such that an interval occurs between the feeding of succeeding cards and a complete cycle of machine operation includes this interval. During this time a cam 44 (FIGURE 1), which is secured to a shaft 45 driven by suitable gearing from the main drive (not shown), becomes effective to raise the upper parts of the punching station 12 by a short distance. For this purpose the punching station is provided with a slide 46 at each side. The slides 46 are secured to side plates 31 (FIGURE 2) of the punching station so that any operated punch knives 20 are withdrawn from the card by a plate 36 which is moved upwards by the side plates 31, the card being retained by the stripper plate 18.

At the same time a further cam 48 carried by a shaft 49 (suitably geared to the shaft 45) is also effective to move the card stop 15 anticlockwise about pivot 50 as shown in FIGURE 2. This has the effect of turning the upper end of the card stop 15 below the surface of the card feeding path 51 so that the card in the punching station is released and is free to be fed by the feed rolls 11 (FIGURE 1) and moved into the stacker.

The angular positioning and peripheral contours of the cams 44 and 48 (FIGURE 2) are such that the card stop 15 is replaced in the card path before the next card 4 is advanced into the punching station, and the punching station is not closed by the action of cam 44 (FIGURE 1) until a new card 4 has been fed completely into the station. Thus, the punch knives 20 are held withdrawn from the card path until the new card is in position. At this time the lowering of the plate 36 allows the knives to rest on the surface of the new card in readiness for a new punching cycle. It will be appreciated that the apparatus may be simplified by arranging that the punch knives 20 are restored after operation by the action of springs, such as 35 acting between shoulders of the knives and the plate 36, and in this case it is possible to secure the side plates 31 in the position shown and to dispense with the cam 44 and its associated mechanism. Restoration of the punch knives 20 by springs 35 effects restoration of the linking members 27 and therefore the restoration springs for the linking members may be omitted. However, it is preferred to positively withdraw the punch knives in the manner described in order to ensure that damage to the cards as the result of a punch knife sticking in the operated position is avoided.

Thus, it will be seen that essentially the matrix of punch knives are considered as arranged in rows of index point significance and columns of information-conveying significance. The rows are selected for punching in succession by the action of the initiating bails 24 which are operated in sequence. The bails are rendered effective to cause punching by the interposition of a linking member. The linking member is controlled by selecting a particular column for entry and engaging the slide 30 associated with the selected column at the required index point time. Thus, only the bail 24 corresponding to this index point is effective to operate a punch knife in the selected column.

The apparatus described in the foregoing paragraphs is a record reproducing device which reproduces, into a blank card, information derived from reading a previously punched card. However, it will be apparent that the punching station described is capable of responding to incoming signals derived from other sources, provided that the index point significance of the incoming items is timed to be in synchronism with the movement of the bails. Thus, a punching device of similar form may be used, for example, as an output recording device for calculating apparatus such as an electronic computer.

Furthermore, it will also be apparent that recording apparatus operating in a similar manner may also be used for other purposes than producing a perforated record card. For example, the movement of a recording member under control of similar initiating bails and linking members may also be used to produce marks on a document by means of inked ribbons or carbon paper. Such documents may consist of index sheets for library purposes, for example, in which subsequent scanning of the recorded marks is to be carried out photoelectrically.

We claim:

1. Data item recording apparatus including a plurality of individual recording members arranged in matrix formation in rows and columns; a group of first members each aligned with a different row respectively of said recording members, said first members being spaced from said recording members and being mounted for movement towards and away from said recording members; first driving means operative to move the first members sequentially towards said recording members; a group of second members each associated with a different column of said recording members respectively; second driving means for operating said second members selectively; and a plurality of groups of linking members, each group of linking members being moved from inoperative to operative positions by operation of a different one of said second members respectively, said linking members when in their operative positions being positioned in the paths of movement of said first members and effective to transmit movement of said first members to said recording members to record items of data and when in their inoperative positions being positioned out of the paths of movement of said first members.

2. Data item recording apparatus including a plurality of individual data recording members arranged in rows and columns; a plurality of linking members each associated with a different one of said recording members respectively; a group of first members, each operable to position the linking members associated with a column of recording devices in driving relationship with the respective recording devices of the column; a group of second members each operable to engage the linking members associated with a different row of recording members respectively and to operate the recording members of a row through the intermediary of the linking members; first driving means for operating the members of one of said groups sequentially; and second driving means for operating the members of the other of said groups selectively.

3. Data item recording apparatus as claimed in claim 2 in which the recording members each consist of a punch for punching record cards.

References Cited by the Examiner

UNITED STATES PATENTS

| | | | |
|---|---|---|---|
| 2,800,182 | 7/57 | Hamilton et al. | 234—88 X |
| 2,862,555 | 12/58 | Jurgens et al. | 234—88 X |
| 2,946,381 | 7/60 | Lisinski | 234—50 X |

ANDREW R. JUHASZ, *Primary Examiner.*

J. SPENCER OVERHOLSER, *Examiner.*